United States Patent
Katsch (10) Patent No.: US 6,697,884 B1
(45) Date of Patent: Feb. 24, 2004

(54) COMMUNICATION PROTOCOL FOR SERIAL PERIPHERAL DEVICES

(75) Inventor: Jude J. Katsch, Felton, CA (US)

(73) Assignee: Genesis Microchip, Inc., Alviso, CA (US)

( * ) Notice: Subject to any disclaimer, the term of this patent is extended or adjusted under 35 U.S.C. 154(b) by 0 days.

(21) Appl. No.: 09/476,268

(22) Filed: Jan. 3, 2000

(51) Int. Cl.$^7$ .............................................. G06F 13/14
(52) U.S. Cl. ............................ 710/18; 710/8; 710/10; 710/19; 711/111; 711/166
(58) Field of Search ............................... 710/19, 8, 10, 710/18; 711/111, 166

(56) References Cited

U.S. PATENT DOCUMENTS

| | | | | |
|---|---|---|---|---|
| 5,623,610 A | * | 4/1997 | Knoll et al. ................. | 710/101 |
| 5,807,175 A | * | 9/1998 | Davis et al. .................. | 463/36 |
| 5,991,830 A | * | 11/1999 | Beard et al. .................. | 710/18 |
| 6,195,712 B1 | * | 2/2001 | Pawlowski et al. ........... | 710/19 |
| 6,460,093 B1 | * | 10/2002 | Taugher ........................ | 710/8 |

* cited by examiner

Primary Examiner—Abdelmoniem Elamin
(74) Attorney, Agent, or Firm—Beyer Weaver & Thomas, LLP (57) ABSTRACT

A computing system comprising a host device which includes a serial communication bus and a processor for controlling communication over the serial communication bus. The computing system further comprises one or more peripheral devices connected to the communication bus. Communication between the host device and the peripheral devices is facilitated by a communication protocol, which includes a procedure for discovering whether the configuration of peripheral devices connected to the communication bus has changed. The discovery procedure starts by the host device sending a first command to all peripheral devices connected to the serial communication bus to determine if the configuration of any of the peripheral devices has changed. If a new peripheral device has been added to the communication bus, the host sends a focus command to a first comm bus port on the communication bus to focus that particular port. The host then sends a command to the first comm bus port to determine if a valid peripheral device is connected to that port. If a valid peripheral device is connected to the first comm bus port, the host obtains device configuration information from the first valid peripheral device. If the first valid peripheral device does not include a device ID from the host, the host assigns a device ID to the first valid peripheral device. In addition, the host will set-up driver software for the first valid peripheral device, if necessary. This procedure is repeated until all devices on the communication bus have been checked, and initialized, if necessary.

19 Claims, 4 Drawing Sheets

COMMUNICATION PROTOCOL FOR SERIAL PERIPHERAL DEVICES

BACKGROUND OF THE INVENTION

The present invention relates generally to a computing system having a novel serial communication bus, and more particularly to a novel communication protocol for communicating with peripheral devices connected to the serial communication bus.

Hot pluggable peripheral device communication buses are well known in the art. For example, universal serial bus (USB) is an external bus standard that supports data transfer rates of up to 12 megabits per second. A single USB port can be used to connect up to 127 peripheral devices, such as mice, modems, keyboards, and the like.

Another external bus standard is IEEE 1394, also commonly referred to as Firewire, I-link and/or Lynx. IEEE 1394 is a very fast external bus standard that supports data transfer rates of up to 400 megabits per second. A single IEEE 1394 port can be used to connect up to 63 external devices.

Both IEEE 1394 and USB support plug and play and hot plugging installations, and also provide power to the connected peripheral devices.

When using these external device communication buses, it is important to be able to determine which devices are connected to the bus, what the device capabilities are, and what the physical configuration of the peripheral devices are; especially when daisy chaining devices together and hot plugging devices onto the bus on the fly.

For example, if new devices are added to the communication bus, either directly or through another peripheral device with connection ports, the host device will need to determine where the devices are located, what the devices are, and what the topology of the connections are (i.e., the connection path to the devices). In addition, the host may need to initialize the devices, for example calibrating a joy stick, or down loading software drivers, before the devices can be used.

Also, during normal operation, it is important that the host be able to efficiently read status information from the devices, such as keystrokes, button presses, joystick positions, mouse movements, and the like. This status information should be read frequently, commonly between 50 and 100 times per second, so it is important that these functions do not require much host processing overhead. Finally, it is important that the host be able to detect device configuration changes (e.g., the removal of a device or a device error) simply, as the host will pole for changes at regular intervals.

The problem with USB and IEEE 1394 is that they require complex communication protocols to handle bus arbitration functionality and other complex communication tasks. In many instances, these complex protocols are not necessary and it is desirable to have a more simplified communication bus and protocol. Thus, what is needed is a simple, yet robust serial communication bus and associated communication protocol for connecting serial peripheral devices.

SUMMARY OF THE INVENTION

According to the invention, a computing system comprising a host device which includes a serial communication bus and a processor for controlling communication over the serial communication bus. The computing system further comprises one or more peripheral devices connected to the communication bus. Communication between the host device and the peripheral devices is facilitated by a communication protocol, which includes a procedure for discovering whether the configuration of peripheral devices connected to the communication bus has changed.

The discovery procedure starts by the host device sending a first command to all peripheral devices connected to the serial communication bus to determine if the configuration of any of the peripheral devices has changed. Configuration changes may include a new device being added to the bus, a device being removed from the bus, a device being moved to a different port on or a different connection to the bus, an error with a device, or any other suitable configuration change.

If a new peripheral device has been added to the communication bus, the host sends a focus command to a first comm bus port on the communication bus to focus that particular port. The host then sends a command to the first comm bus port to determine if a valid, focused peripheral device is connected to that port. If a valid peripheral device is connected to the first comm bus port, the host obtains device configuration information from the first valid peripheral device. If the first valid peripheral device does not include a device ID from the host, the host assigns a device ID to the first valid peripheral device. In addition, the host will set-up driver software for the first valid peripheral device, if necessary.

After the first valid peripheral device is initialized, the host tags the first valid peripheral device, sends a blur command to it, and selects a first device port on the first valid peripheral device. The blur command is converted to a focus command at the first valid peripheral device and then sent to the selected first device port on the first, valid peripheral device. The blur command also is sent to all other devices on the comm bus port, but the devices that are not tagged merely pass the command through as a blur command, which requires no processing or response. The focus command focuses any device connected to the first device port. The host then sends a command to the first device port to determine if a valid, focused device is connected to that port. If a second valid peripheral device is connected to the first device port, the host obtains device configuration information from the second valid peripheral device. As with the first valid peripheral device, if the second valid peripheral device does not have an ID from the host, the host will assign it an ID. Also, the host will load driver software for the second valid peripheral device, if necessary.

If there is no second valid peripheral device connected to the first device port of the first valid peripheral device, the host determines if there is a second device port on the first valid peripheral device. If there is a second device port, the host sends a blur command to the first valid peripheral device and selects the second device port thereon. The blur command is converted to a focus command at the first valid peripheral device and then sent to the selected second device port on the first valid peripheral device. The focus command focuses any device connected to the second device port. The host then sends a command to the second device port to determine if a valid device is connected to that port. If a second valid peripheral device is connected to the second device port, the host obtains device configuration information from the second valid peripheral device. As discussed above, if the second valid peripheral device does not have an ID from the host, the host will assign it an ID. Also, the host will load driver software for the second valid peripheral device, if necessary.

If there is no second device port on the first valid peripheral device and there is a second comm bus port on the communication bus, the host sends a focus command to the second comm bus port on the communication bus, which focuses any device connected to the second comm bus port. The host then sends a command to determine if a valid, focused peripheral device is connected to the second comm bus port. If there is a valid peripheral device connected to the second comm bus port, the host will initialize the device in the same manner as discussed above. The procedure is then continued until every device on every port has been checked and initialized, if necessary.

A more complete understanding of the present invention may be derived by referring to the detailed description of preferred embodiments and claims when considered in connection with the figures, wherein like reference numbers refer to similar items throughout the figures.

DESCRIPTION OF THE SPECIFIC EMBODIMENTS

Figure 1:
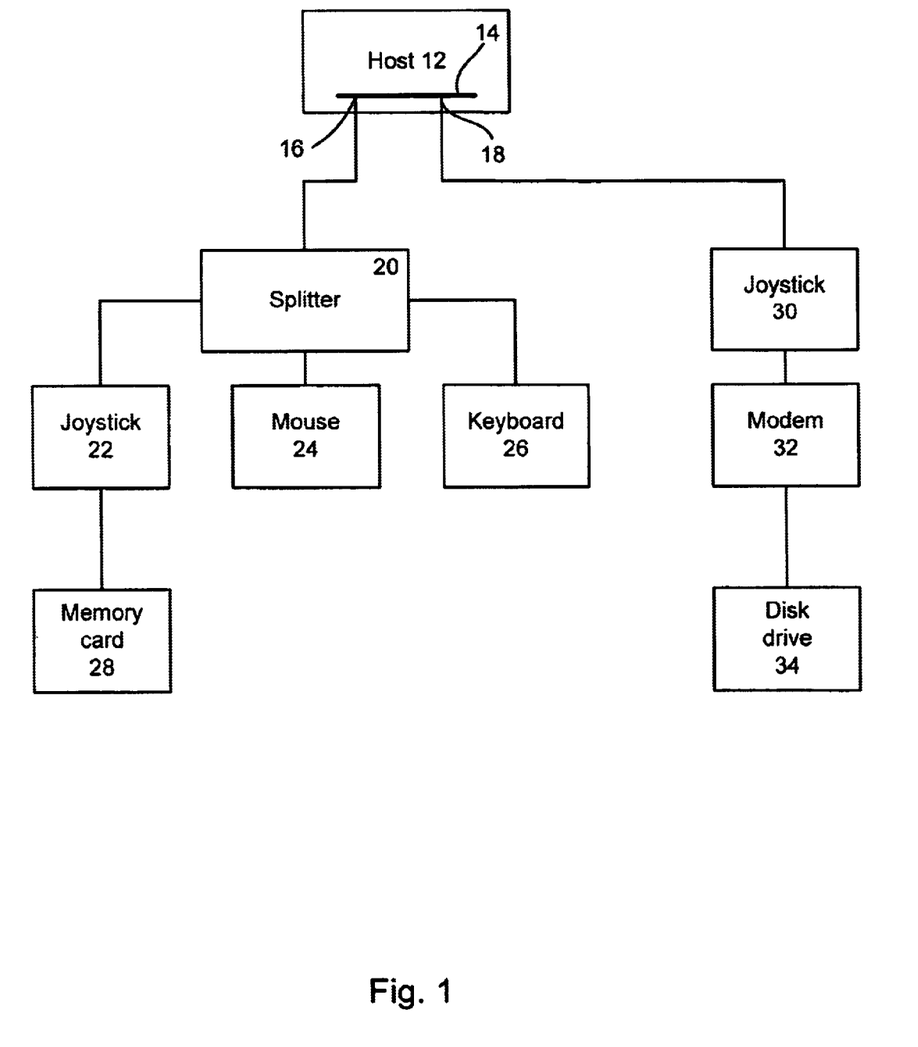
FIG. 1 is a block diagram of a system utilizing a communication bus and protocol in accordance with the present invention.

The present invention relates generally to a computing system having a novel serial communication bus, and more particularly to a novel communication protocol for communicating with peripheral devices connected to the serial communication bus. Referring now to FIG. 1, a computing system 10 in accordance with one embodiment of the present invention is shown. Computing system 10 comprises a host computing device 12 including a communication bus 14, and a plurality of devices 20–34 connected to communication bus 14. Preferably, the devices are connected to communication bus 14 via one or more comm bus ports on communication bus 14. In the particular example illustrated in FIG. 1, communication bus 14 comprises two comm bus ports 16 and 18. As illustrated, devices 20–28 are connected to communication bus 14 via comm bus port 16, and devices 30–34 are connected to communication bus 14 via comm bus port 18. While the illustrated embodiment of the present invention shows two comm bus ports (16, 18) and eight devices (20–34) connected to communication bus 14 via those comm bus ports, one skilled in the art will appreciate that communication bus 14 may comprise any number of comm bus ports; each of which can have 31 devices connected thereto, as discussed in more detail below.

In accordance with an alternative embodiment of the present invention, instead of having multiple comm bus ports, system 10 may be configured with a single comm bus port having two or more separate registers and control logic; one for each separate set of devices. In accordance with this particular aspect of the present invention, system 10 can support multiple sets of devices (up to 31 devices in each set) through a single comm bus port.

Host device 12 may comprise any suitable computing device, such as a PC, a network workstation, a video game player, a DVD or CD player, a satellite or cable television receiver, or the like. While not illustrated in FIG. 1, one skilled in the art will appreciate that host device 12 may include one or more processing units, and suitable memory and storage units, such as, for example, DRAM, SDRAM, flash memory, and/or a suitable hard drive storage device. Preferably, at least one of the processing units is used to control communications between host device 12 and the attached peripheral devices 20–34 over communication bus 14.

In accordance with one embodiment of the present invention, the operation of host device 12 may be controlled by a media processing unit, such as the one disclosed in U.S. patent application Ser. No. 09/476,761, filed on Jan. 3, 2000, and entitled "A Media Processing System and Method," the entirety of which is incorporated herein by reference.

Communication bus 14 is configured to support a wide range of peripheral devices, such as user interface devices, storage devices, and communication devices, to name but a few. Examples of a few devices that maybe supported by communication bus include game-pad controllers, joysticks, keyboards, mice, memory cards, 3D glasses (e.g., LCD shutters), modems, simple network interfaces, etc.

In accordance with one embodiment of the present invention, the interface to communication bus 14 preferably comprises a four-pin connector. The pins of the connector include power, ground, clock output, and bidirectional data. The protocol over the interface preferably comprises a synchronous serial bit-stream. Host 12 is a master device that generates the clock and issues commands to the individual slave devices (i.e., peripheral devices), which may then respond. The data transfer rate over this interface may be programmable to match the electrical capabilities of the external hardware devices.

Figure 2:
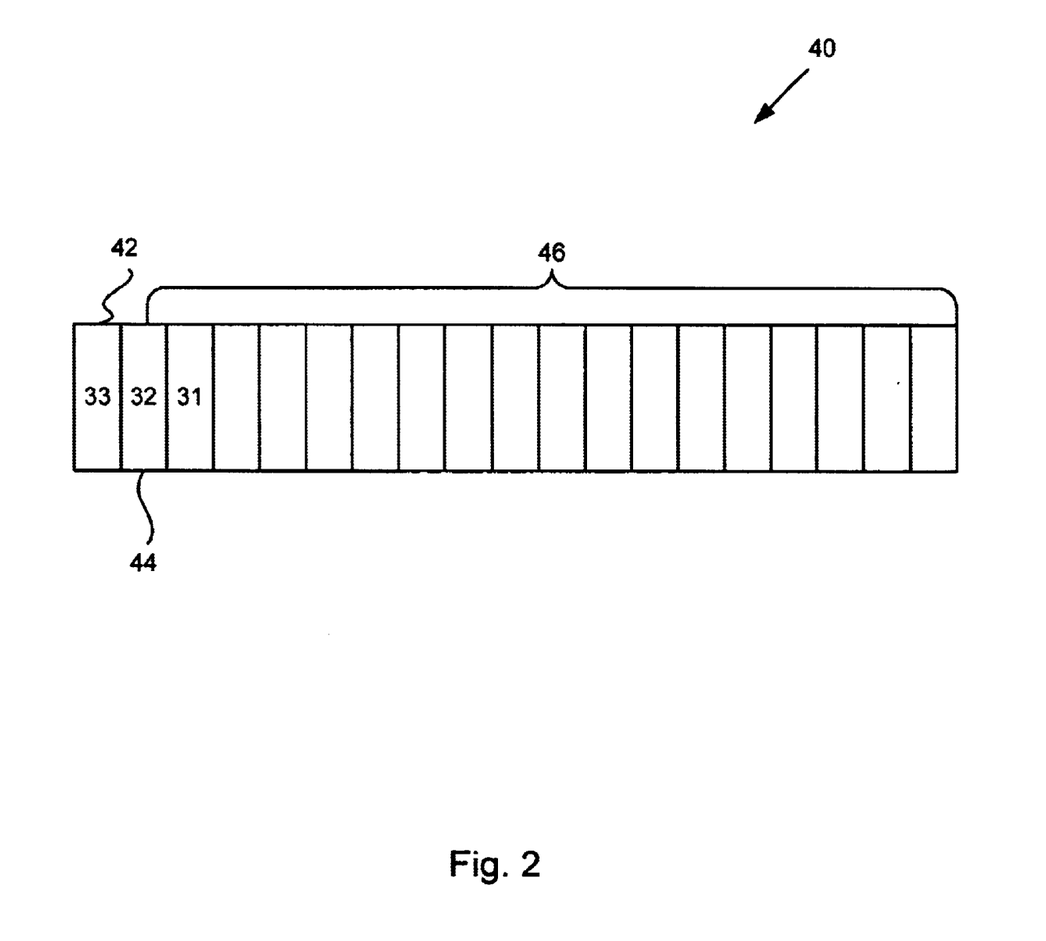
FIG. 2 is a diagram of a communication data packet used by the communication bus.
Figure 3:
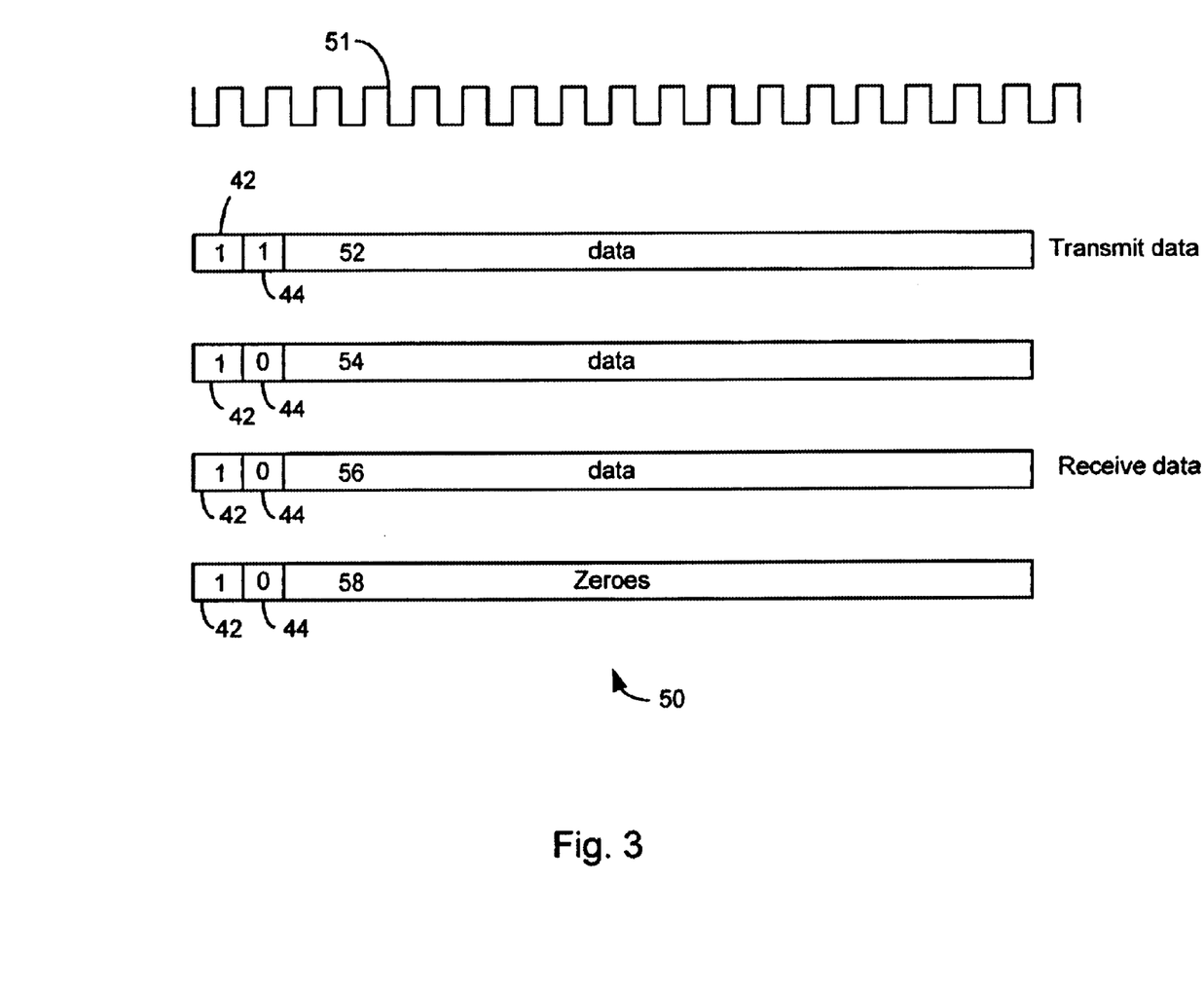
FIG. 3 is a diagram illustrating the different communication data packets that may be used.

Referring now to FIGS. 2 and 3, a more detailed discussion of communication bus 14 will follow. Specifically, communication bus 14 preferably comprises a 32-bit communication bus. That is, data communications between host device 12 and each peripheral device occurs in 32-bit packets. However, as illustrated in FIG. 2, the actual physical size of each packet traveling between host device 12 and each peripheral device is 34-bits. The 34-bits are allocated as follows: (1) a 1-bit start bit 42; (2) a 1-bit flag bit 44 used to differentiate between command and data packets; and (3) a 32-bit packet 46 used to carry the command and data information. Start bit 42 preferably is always set to one, and acts as a start bit to signal the framing of the following bits. Bit 44 can be a '1' or a '0', and is used to signal whether the packet is a data packet or a command packet. As illustrated in FIG. 3, a transmit data packet 52 includes a '1' in bit 44, signifying that the packet is a data packet, and transmit command packet 54 includes a '0' in bit 44, signifying that the packet is a command packet. For data packets received by host device 12 from the peripheral devices, bit 44 is set to '0', signifying that the receive packet includes data (see receive data packet 56 in FIG. 3). If bit 44 is set to '1', then the packet received from the peripheral device includes zeros (see receive null packet 58 in FIG. 3). A null response from a peripheral device may be used to signal that the peripheral device is unable to respond to a command from the host.

Note that the transmitted data changes on the falling edge of clock 51 and should be sampled on the rising edge of clock 51, otherwise clock and data can race. The rising edge of receive data is used to recognize the framing of receive data, which is synchronous to the transmit clock, but has no defined phase relationship with it.

All communications between host device 12 and peripheral devices 20–34 is initiated by host device 12. Devices only will transmit data in response to a command received from host device 12. In accordance with this aspect of the invention, communication bus 14 can share a single data channel (i.e., it is half duplex) without any two devices on the same comm bus port ever driving the bus at the same time, because only one device from each comm bus port will be responding to a host command at a time.

In order to locate devices on communication bus 14 and communicate with those devices, host device 12 preferably includes and processes a communication protocol in accordance with the present invention. In accordance with this particular aspect of the present invention, the goal of the device initialization process of the present communication protocol is to "brand" each device with a unique identity number between 1 and 31. Thus, communication bus 14 can support a maximum of 31 devices per comm bus port on host device 12. This identity number is used to address each device, and to allow global polling of all devices on a comm bus port. As discussed in more detail below with reference to a particular example, when host device 12 globally polls all devices on a given comm bus port, each device preferably inserts a 1-bit response in the particular location of a 32-bit word associated with that device. Thus, if a device is branded with an ID number of 16, that particular device will insert a '1' in bit 16 of a 32-bit response word to a global polling request.

Each device connected to communication bus 14 includes three state bits: tagged bit, a focused bit, and a branded bit. After host device 12 "focuses" a device i.e., sends a focus command to the device, thus setting its focused bit high), host device 12 can "probe" that device to determine device specific information, such as device type, device configuration, drive software needed, the number of communication bus ports on the device, etc. In addition, when a device is "focused", host device 12 can "brand" the device by assigning it an identity number between 1 and 31, and setting the branded bit high.

During the initialization process, host device 12 traverses communication bus 14, attempting to "focus" each potential device position in turn. Thus, host device 12 tries to "focus" the first device attached to it, and if it finds a device there, it will "probe" and "brand" it, if necessary. Then, host device 12 will attempt to locate, "focus", "probe", and "brand" all devices attached to that first device. The host will continue this process until all devices connected to communication bus 14 have been initialized.

There are two commands associated with the "focus" state: focus and blur. A device becomes "focused" when it receives a focus command. Because devices typically will pass through commands to other devices connected to the device, there are rules for the focus and blur commands. The rules are as follows:

1. All devices convert a focus command to a blur command as the command propagates from the "focused" device to devices connected to the "focused" device.
2. A tagged device converts a blur command to a focus command on one selected port.
3. All other devices pass through a blur command.

The following protocol commands are always available in normal operation to determine bus status:

| Command | Bit ID | Description |
| --- | --- | --- |
| alive | 0 | All branded devices respond with a '1' in the bit position corresponding to their brand ID. All unbranded devices respond with a '1' in bit position 0. This is used to determine if the bus configuration has changed. |
| request | 0 | All branded devices respond with a '1' in the bit position corresponding to their brand ID if they request interaction. All unbranded devices will not respond. This can be used as a polled interrupt mechanism. |
| error | 0 | All branded devices respond with a '1' in the bit position corresponding to their brand ID if an error condition exists. All unbranded devices respond with a '1' in bit position 0 if an error condition exists. |

When host 12 sends an alive command, all devices that have already been "branded" (i.e., the device is assigned an IO and the branded flag is set) reply by sending a response packet in which the bit position corresponding to brand ID for the device is set to '1'. All unbranded devices reply by sending a response packet in which bit-0 is set to '1'. By analyzing the responses to the alive command, host 12 can determine if the status of any of the devices has changed. If a device has been removed, there will no longer be a '1' at the device's ID bit position. If one or more new devices have been added, there will be a '1' in bit position 0.

The request command is a polling type command used to determine if a peripheral device requests interaction. With the request command, all branded devices respond with a '1' in the bit position corresponding to their brand ID if they request interaction. All unbranded devices will not respond.

The error command also is a polling type command, and is used to determine if any device has an error condition. With the error command, all branded devices respond with a '1' in the bit position corresponding to their brand ID if an error condition exists. All unbranded devices respond with a '1' in bit position 0 if an error condition exists.

The following commands are device configuration commands:

| Command | Bit ID | Description |
| --- | --- | --- |
| reset | 0 | Resets every device on a comm bus port. Reset clears the tagged, focussed, and branded bits on each device. |
| reset | 1–31 | Resets the selected device(s). |
| tag | 0 | Untags all devices (i.e., clears their tagged bit). |
| tag | 1–31 | Tags the selected device (i.e. sets the tagged bit for the selected device). |
| focus | 0 | Any device that receives a focus command becomes "focused" (i.e., the focused bit is set). All focused devices convert a focus command to a blur command as the command is passed through to all devices connected to the "focused" device. |
| blur | 0 | Any device that receives a blur command becomes unfocused (i.e., the focused bit is cleared). |
| unbrand | 0 | Unbrands all devices (i.e., clears the branded bit for all devices). |
| unbrand | 1–31 | Unbrands the selected device. |
| brand | 0 | Unbrands the "focused" device. |
| brand | 1–31 | Brands the focused device with a brand ID. |
| probe | 0 | Reads probe information from the "focused" device. This gives the basic device configuration information. |
| probe | 1–31 | Reads probe information from the selected device. |

-continued

| Command | Bit ID | Description |
|---|---|---|
| magic | 0 | Reads the pre-defined long word ($4A554445) from the "focused" device. This is used to show that there is a valid device at the current focused position. |
| magic | 1–31 | Reads the pre-defined long word from the selected device. |

The above commands are best described by way of example. Thus, referring now to FIG. 4, an example of a process for initializing devices connected to communication bus 14 in accordance with the communication protocol of the present invention will be described.

Figure 4:
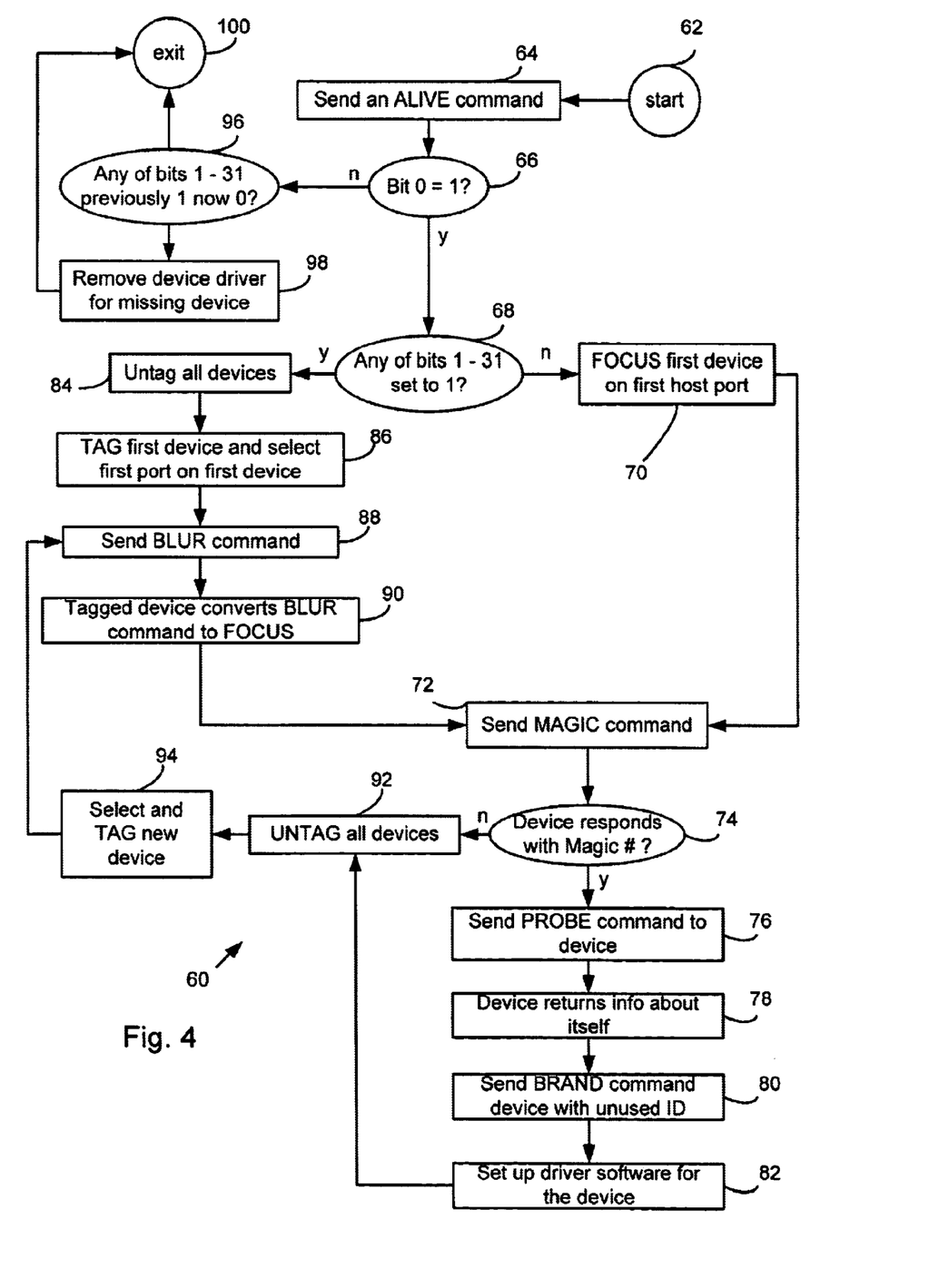
FIG. 4 is a flow chart illustrating a process for initializing and/or changing the configuration of devices on the communication bus.

To start (step 62) the process of initializing devices connected to communication bus 14, host 12 preferably sends an alive command (step 64) to all the devices connected to communication bus 14, either directly or through another device.

As mentioned above, the alive command is a way for host 12 to determine if the configuration of any of the devices connected to communication bus 14 has changed.

First, host 12 checks the responses from the devices to determine if bit-0 is set to '1' (step 66). If bit-0 is set to '1' in any of the response packets, it means that an "unbranded" device is attached to communication bus 14. This typically occurs when a new device is added to the bus. If bit-0 is set to '1' in any of the response packets, host 12 next checks to determine if any of bits 1–31 are set in any of the response packets (step 68). If any of bits 1–31 are set in any of the response packets, it means that at least one "branded" device is connected to communication bus 14. If none of the response packets have any of bits 1–31 set, then there are no "branded" devices connected to the bus. In accordance with this particular example, the protocol of the present invention handles the initialization process slightly differently when there are "branded" devices connected to the bus, and when there are not. This particular example first will discuss the process when there are no "branded" devices connected to the bus (i.e., none of bits 1–31 are set in any response packet). This typically occurs when host 12 is first turned-on and all devices need to be initialized.

If there are no "branded" devices connected to communication bus 14, host 12 preferably sends a focus command to the first device on the first comm bus port 16 (step 70). In accordance with this particular example, the first device on first comm bus port 16 is splitter 20 (see FIG. 1). After host 12 has sent the focus command to the first device (splitter 20) on first comm bus port 16, host 12 sends a magic command to determine if the device has been "focused." If splitter 20 has been "focused" (i.e., the focus bit has been set), splitter 20 will respond to the magic command with a predefined response (step 74). If splitter 20 does not respond to the magic command with the predefined response, it means that either there is not a device at that location, or there is an error with that device. In any event, the protocol will continue to step 92, which is discussed in more detail below.

In this particular example, since splitter 20 is a valid device, it will return the predetermined response. Next, host 12 sends a probe command to splitter 20 in order to retrieve information about the device (step 76). In response to the probe command, splitter 20 will return information about its configuration (step 78). For example, splitter 20's response may include information such as device type and version, whether the device is already branded, and any other configuration information about itself. If splitter is "unbranded," host 12 will send a brand command to the device along with a brand ID (step 80). Upon receiving the brand command the branded flag in splitter 20 is set, and splitter 20 is assigned the brand ID forwarded from the host. Finally, upon initializing splitter 20 by probing and branding it, host 12 will set-up driver software for the device in host 12, if necessary (step 82).

After the first device has been initialized (in this case splitter 20), host 12 will attempt to initialize the next device on the bus. In accordance with this aspect of the invention, host 12 may "untag" all devices by sending a tag command with bit-0 set to '1' (step 92). A tag command in which bit-0 is set to '1' is considered an "untag" command. In accordance with an alternative embodiment of the present invention, if no device previously has been tagged, host 12 may skip step 92 and move to step 94. At step 94, host 12 preferably selects and "tags" the previously initialized device, which in this particular example is splitter 20. To "tag" splitter 20, host 12 sends a tag command with the bit position for the brand ID for splitter 20 set to '1,' which sets the tagged flag in splitter 20. For example, if splitter 20 is assigned a brand ID of 15, host 12 will send a tag command with bit-15 set to '1,' which tells splitter 20 that it is being "tagged."

After splitter 20 is "tagged," host 12 selects the first port on splitter 20 and sends a blur command to splitter 20, and more particularly, to the first port on splitter 20 (step 88). Upon receiving the blur command, splitter 20 converts the blur command to a focus command and passes it through to the device connected to the selected first port on splitter 20 (step 90). In accordance with this particular example, the first device on the first port of splitter 20 is joystick 22. Next, host 12 sends a magic command to determine if a valid device was "focused" on the first port of splitter 20 (step 72).

If the device on the first port of splitter 20 (in this case, joystick 22) was "focused," host 12 will repeat steps 76–82 for joystick 22. That is, host 12 will "probe" "brand" and set-up driver software for joystick 22. Host 12 then will propagate across the bus, repeating the process for the remaining devices. In this particular example, host 12 may initialize the remaining devices in the following order: (1) memory card 28; (2) mouse 24; (3) keyboard 26; (4) joystick 30; (5) modem 32; and (6) disk drive 34.

If, at step 72, there is no valid focused device (e.g., joystick 22 is not there or has an error), host 12 will move on to step 92, which untags all devices, and then on to step 94, which selects and tags the next available port. In this particular example, the next available port would be the second port on splitter 20, to which is connected mouse 24. Again host 12 will send a blur command to the second port on splitter 20 (step 88). Splitter 20 will convert the blur command to a focus command and pass it to mouse 24, which will then be "focused (step 90)." Host 12 then will send a magic command to determine if there is a valid, focused device on the second port of splitter 20 (step 72). If there is, host-12 will perform steps 76–82 and then move on to the next device. If not, host 12 moves to step 92 and/or 94 and repeats the process until all devices are initialized or no more devices are found.

Returning back to step 68, if communication bus 14 already includes "branded" devices connected to it (i.e., any response to the alive command has any of bits 1–31 set), host 12 will move on to step 84, which untags all devices. As mentioned above, to untag all devices, host 12 sends a tag command with bit-0 set to '1.' Next, host 12 will "tag" the first device on the first comm bus port 16 by sending a tag command to it (step 86). In this particular example, the first device is splitter 20. Then, host 12 will select the first port on splitter 20 and send a blur command to splitter 20 (step 88). As discussed above, splitter 20 will convert the blur command to a focus command and then pass it to the first device on the first port of splitter 20 to "focus" it (step 90). In this case, joystick 22. Host 12 then will send a magic command to the first port on splitter 20 to determine if a valid, focused device is connected thereto (step 72). If so, host 12 will perform steps 76–82, which probes, brands and sets-up software for the device. If there is no valid, focused device on the first port of splitter 20, host 12 will move on to the next device on the next port. As discussed above, this process will continue until all devices on the bus have been initialized.

Returning now to step 66, if there are no new devices on communication bus 14 (i.e., no response to the alive command had bit-0 set to '1'), host 12 will check to determine if any devices were removed from the bus (step 96). To determine if a device has been removed, host 12 will check the responses to the alive command to determine if any of bits 1–31 that were previously set to '1' are now set to '0'. If so, host 12 will remove driver software for the removed device(s) (step 98) and then end the initialization protocol (step 100). If no devices were removed, host 12 will end the initialization process step 102. Also, while FIG. 3 shows the protocol as checking to determine if any devices have been removed only if no new devices were added, one skilled in the art will appreciate that the protocol may check for removed devices after all new devices have been initialized, or at any other time during operation. Therefore, the present invention is not limited to the illustrated embodiment.

In conclusion, the present invention provides a novel communication bus and bus protocol, which can be used in large number of computing systems. While a detailed description of presently preferred embodiments of the invention have been given above, various alternatives, modifications, and equivalents will be apparent to those skilled in the art. For example, while the particular example of the present invention as disclosed herein uses specific command names, such as reset, tag, focus, blur, unbrand, brand, probe, magic, alive, request, and error, to name a few, one skilled in the art will appreciate that other command names could be used without varying from the spirit of the invention. Therefore, the above description should not be taken as limiting the scope of the invention which is defined by the appended claims.

What is claimed is:

1. A communication protocol comprising a method for discovering whether the configuration of peripheral devices connected to a serial communication bus on a host device has changed, said method comprising the steps of:

said host sending a first command to all peripheral devices connected to said serial communication bus to determine if the configuration of any of said peripheral devices has changed;

if a new peripheral device has been added to said communication bus, sending a focus command to a first comm bus port on said communication bus;

determining if said first comm bus port on said communication bus comprises a first valid peripheral device connected to said first port;

if a first valid peripheral device is connected to said first comm bus port on said communication bus, obtaining device configuration information from said first valid peripheral device;

if said first valid peripheral device does not include a device ID from said host, said host assigning said first valid peripheral device with a device ID;

tagging said first valid peripheral device;

sending a blur command to said first valid peripheral device and selecting a first device port on said first valid peripheral device;

said first valid peripheral device converting said blur command to a focus command and sending said focus command to said first device port on said first valid peripheral device;

determining if said first device port on said first valid peripheral device comprises a second valid Peripheral device connected to said first device port;

if a second valid peripheral device is connected to said first device port, obtaining device configuration information from said second valid peripheral device;

if said second valid peripheral device does not include a device ID from said host, said host assigning said second valid peripheral device with a device ID, wherein if there is no second valid peripheral device connected to said first device port on said first valid peripheral device, said method further comprises the steps of:

determining if there is a second device port on said first valid peripheral device; if there is a second device port on said first valid peripheral device, sending a blur command to said first valid peripheral device and selecting said second device port on said first valid peripheral device;

said first valid peripheral device converting said blur command to a focus command and sending said focus command to said second device port on said first valid peripheral device;

determining if said second device port on said first valid peripheral device comprises a second valid peripheral device connected to said second device port;

if a second valid peripheral device is connected to said second device port, obtaining device configuration information from said second valid peripheral device; and if said second valid peripheral device does not include a device ID from said host, said host assigning said second valid peripheral device with a device ID.

2. The method as recited in claim 1, further comprising the step of: setting up driver software for said first valid peripheral device.

3. The method as recited in claim 1, further comprising the step of: setting up driver software for said second valid peripheral device.

4. The method as recited in claim 1, further comprising the step of: setting up driver software for said second valid peripheral device.

5. The method as recited in claim 1, wherein if there is no second device port on said first valid peripheral device, said method further comprises the steps of:

sending a focus command to a second comm bus port on said communication bus;

determining if said second comm bus port on said communication bus comprises a second valid peripheral device connected to said second comm bus port;

if a second valid peripheral device is connected to said second comm bus port on said communication bus, obtaining device configuration information from said second valid peripheral device; and if said second valid peripheral device does not include a device ID from said host, said host assigning said second valid peripheral device with a device ID.

6. The method as recited in claim 5, further comprising the step of: setting up driver software for said second valid peripheral device.

7. A communication protocol comprising a method for discovering whether the configuration of peripheral devices connected to a serial communication bus on a host device has changed, said method comprising the steps of:

said host sending a first command to all peripheral devices connected to said serial communication bus to determine if the configuration of any of said peripheral devices has changed;

if a new peripheral device has been added to said communication bus and other valid peripheral devices exist on said communication bus, tagging a first valid peripheral device connected to a first comm bus port on said communication bus;

sending a blur command to said first valid peripheral device and selecting a first device port on said first valid peripheral device;

said first valid peripheral device converting said blur command to a focus command and sending said focus command to said first device port on said first valid peripheral device;

determining if said first device port on said first valid peripheral device comprises a second valid peripheral device connected to said first device port;

if a second valid peripheral device is connected to said first device port on said first peripheral device, obtaining device configuration information from said second valid peripheral device;

if said second valid peripheral device does not include a device ID from said host, said host assigning said second valid peripheral device with a device ID; setting up driver software for said second valid peripheral device;

tagging said second valid peripheral device;

sending a blur command to said second valid peripheral device via said first valid peripheral device and selecting a second device port on said second valid peripheral device;

said second valid peripheral device converting said blur command to a focus command and sending said focus command to said second device port on said second valid peripheral device;

determining if said second device port on said second valid peripheral device comprises a third valid peripheral device connected to said second device port;

if a third valid peripheral device is connected to said second device port, obtaining device configuration information from said third valid peripheral device;

if said third valid peripheral device does not include a device ID from said host, said host assigning said third valid peripheral device with a device ID, wherein if there is no third valid peripheral device connected to said second device port on said second valid peripheral device, said method further comprises the steps of:

determining if there is a third device port on said second valid peripheral device;

if there is a third device port on said second valid peripheral device, sending a blur command to said second valid peripheral device and selecting said third device port on said second valid peripheral device;

said second valid peripheral device converting said blur command to a focus command and sending said focus command to said third device port on said second valid peripheral device;

determining if said third device port on said second valid peripheral device comprises a third valid peripheral device connected to said third device port;

if a third valid peripheral device is connected to said third device port, obtaining device configuration information from said third valid peripheral device; and if said third valid peripheral device does not include a device ID from said host, said host assigning said third valid peripheral device with a device ID.

8. The method as recited in claim 7, further comprising the step of: setting up driver software for said second valid peripheral device.

9. The method as recited in claim 7, further comprising the step of: setting up driver software for said third valid peripheral device.

10. The method as recited in claim 7, further comprising the step of:

setting up driver software for said third valid peripheral device.

11. The method as recited in claim 7, wherein if there is no third device port on said second valid peripheral device, said method further comprises the steps of:

sending a focus command to a second comet bus port on said communication bus;

determining if said second comm bus port on said communication bus comprises a third valid peripheral device connected to said second comm bus port;

if a third valid peripheral device is connected to said second comm bus port on said communication bus, obtaining device configuration information from said third valid peripheral device; and if said third valid peripheral device does not include a device ID from said host, said host assigning said third valid peripheral device with a device ID.

12. The method as recited in claim 11, further comprising the step of: setting up driver software for said third valid peripheral device.

13. A computing system comprising:

a host device including a serial communication bus and a processor for controlling communication over said serial communication bus; and one or more peripheral device connected to said serial communication bus;

said host further comprising a communication protocol for discovering whether the configuration of peripheral devices connected to said communication bus has changed, said protocol comprising the steps of:

said host sending a first command to all peripheral devices connected to said serial communication bus to determine if the configuration of any of said peripheral devices has changed;

if a new peripheral device has been added to said communication bus, sending a focus command to a first comm bus port on said communication bus;

determining if said first comm bus port on said communication bus comprises a first valid peripheral device connected to said first port;

if a first valid peripheral device is connected to said first comm bus port on said communication bus, obtaining device configuration information from said first valid peripheral device;

if said first valid peripheral device does not include a device ID from said host, said host assigning said first valid peripheral device with a device ID;

setting up driver software for said first valid peripheral device;

tagging said first valid peripheral device;

sending a blur command to said first valid peripheral device and selecting a first device port on said first valid peripheral device;

said first valid peripheral device converting said blur command to a focus command and sending said focus command to said first device port on said first valid peripheral device;

determining if said first device port on said first valid peripheral device comprises a second valid peripheral device connected to said first device port;

if a second valid peripheral device is connected to said first device port, obtaining device configuration information from said second valid peripheral device;

if said second valid peripheral device does not include a device ID from said host, said host assigning said second valid peripheral device with a device ID, wherein if there is no second valid peripheral device connected to said first device port on said first valid peripheral devices said protocol further comprises the steps of:

determining if there is a second device port on said first valid peripheral device;

if there is a second device Port on said first valid peripheral device, sending a blur command to said first valid peripheral device and selecting said second device port on said first valid peripheral device;

said first valid peripheral device converting said blur command to a focus command and sending said focus command to said second device port on said first valid peripheral device;

determining if said second device port on said first valid peripheral device comprises a second valid peripheral device connected to said second device port;

if a second valid peripheral device is connected to said second device port, obtaining device configuration information from said second valid peripheral device; and if said second valid peripheral device does not include a device ID from said host, said host assigning said second valid peripheral device with a device ID.

14. The system as recited in claim 13, wherein said protocol further comprises the step of:

setting up driver software for said first valid peripheral device.

15. The system as recited in claim 13, wherein if there is no second device port on said first valid peripheral device, said protocol further comprises the steps of:

sending a focus command to a second comm bus port on said communication bus;

determining if said second comm bus port on said communication bus comprises a second valid peripheral device connected to said second comm bus port;

if a second valid peripheral device is connected to said second comm bus port on said communication bus, obtaining device configuration information from said second valid peripheral device; and if said second valid peripheral device does not include a device ID from said host, said host assigning said second valid peripheral device with a device ID.

16. A computing system comprising:

a host device including a serial communication bus and a processor for controlling communication over said serial communication bus; and one or more peripheral device connected to said serial communication bus;

said host further comprising a communication protocol for discovering whether the configuration of peripheral devices connected to said communication bus has changed, said protocol comprising the steps of:

said host sending a first command to all peripheral devices connected to said serial communication bus to determine if the configuration of any of said peripheral devices has changed;

if a new peripheral device has been added to said communication bus and other valid peripheral devices exist on said communication bus, tagging a first valid peripheral device connected to a first comm bus port on said communication bus;

sending a blur command to said first valid peripheral device and selecting a first device port on said first valid peripheral device;

said first valid peripheral device converting said blur command to a focus command and sending said focus command to said first device port on said first valid peripheral device;

determining if said first device port on said first valid peripheral device comprises a second valid peripheral device connected to said first device port;

if a second valid peripheral device is connected to said first device port on said first peripheral device, obtaining device configuration information from said second valid peripheral device;

if said second valid peripheral device does not include a device ID from said host, said host assigning said second valid peripheral device with a device ID;

setting up driver software for said second valid peripheral device;

tagging said second valid peripheral device;

sending a blur command to said second valid peripheral device via said first valid peripheral device and selecting a second device port on said second valid peripheral device;

said second valid peripheral device converting said blur command to a focus command and sending said focus command to said second device port on said second valid peripheral device;

determining if said second device port on said second valid peripheral device comprises a third valid peripheral device connected to said second device port;

if a third valid peripheral device is connected to said second device port, obtaining device configuration information from said third valid peripheral device; and if said third valid peripheral device does not include a device ID from said host, said host assigning said third valid peripheral device with a device ID.

17. The system as recited in claim 16, wherein said protocol further comprises the step of:

setting up driver software for said second valid peripheral device.

18. The system as recited in claim 16, wherein if there is no third valid peripheral device connected to said second device port on said second valid peripheral device, said protocol further comprises the steps of:

determining if there is a third device port on said second valid peripheral device;

if there is a third device port on said second valid peripheral device, sending a blur command to said second valid peripheral device and selecting said third device port on said second valid peripheral device;

said second valid peripheral device converting said blur command to a focus command and sending said focus command to said third device port on said second valid peripheral device;

determining if said third device port on said second valid peripheral device comprises a third valid peripheral device connected to said third device port;

if a third valid peripheral device is connected to said third device port, obtaining device configuration information from said third valid peripheral device; and if said third valid peripheral device does not include a device ID from said host, said host assigning said third valid peripheral device with a device ID.

19. The system as recited in claim 18, wherein if there is no third device port on said second valid peripheral device, said protocol further comprises the steps of:

sending a focus command to a second comm bus port on said communication bus;

determining if said second comm bus port on said communication bus comprises a third valid peripheral device connected to said second comm bus port;

if a third valid peripheral device is connected to said second comm bus port on said communication bus, obtaining device configuration information from said third valid peripheral device; and if said third valid peripheral device does not, include a device ID from said host, said host assigning said third valid peripheral device with a device ID.

* * * * *